United States Patent [19]

Lantz et al.

[11] Patent Number: 4,594,177

[45] Date of Patent: Jun. 10, 1986

[54] SURFACE DEMOISTURIZING COMPOSITION AND USE THEREOF

[76] Inventors: André Lantz, Domaine de la Hêtraie, Vernaison, France, 69390; Henri Mathais, Villa No. 2, Chemin de l'Indiennerie, France, 69370; Gérard Dupuis, 34, rue Auguste Blanche, Puteaux, France, 92800

[21] Appl. No.: 468,499

[22] Filed: Feb. 22, 1983

[30] Foreign Application Priority Data

Feb. 23, 1982 [FR] France ................................ 82 02923

[51] Int. Cl.$^4$ .......................... C09K 3/00; C11D 1/62
[52] U.S. Cl. ..................................... 252/194; 252/153; 252/545; 252/DIG. 17
[58] Field of Search ............... 252/194, 545, DIG. 17, 252/153

[56] References Cited

U.S. PATENT DOCUMENTS

| | | | |
|---|---|---|---|
| 3,903,012 | 9/1975 | Brandreth | 252/194 |
| 4,043,923 | 8/1977 | Loudas | 252/545 X |
| 4,176,176 | 11/1979 | Cella et al. | 252/545 X |
| 4,182,687 | 1/1980 | Bartlett | 252/194 |

FOREIGN PATENT DOCUMENTS

| | | |
|---|---|---|
| 1515393 | 1/1968 | France . |
| 1541592 | 8/1968 | France . |
| 2281778 | 12/1976 | France . |

*Primary Examiner*—Richard D. Lovering
*Attorney, Agent, or Firm*—Pennie & Edmonds

[57] ABSTRACT

Demoisturizing composition used for the displacement of liquid water, comprising a chlorofluorocarbon that is liquid at room temperature, containing a surface-active agent responding to the formula:

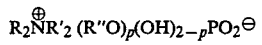

in which
  R is an alkyl group in $C_6$–$C_{18}$
  R' is an alkyl group in $C_1$ to $C_2$
  R'' is an alkyl group in $C_1$ to $C_{18}$
  p is a value ranging between 1 and 2 characterized in that the surface-active composition is prepared by mixing the following three constituents:

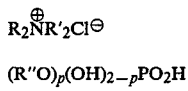

$(R''O)_p(OH)_{2-p}PO_2H$

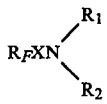

where $R_F$ represents a straight or branched perfluorinated alkyl chain of formula $C_qF_{2q+1}$ in which q is a whole number ranging between 2 and 20 and where X is a divalent bond group that may be partially halogenated and $R_1$ and $R_2$ represent a hydrogen atom, an alkyl radical or a hydroxyalkyl radical, containing less than 6 carbon atoms.

24 Claims, No Drawings

SURFACE DEMOISTURIZING COMPOSITION AND USE THEREOF

FIELD OF THE INVENTION

This invention relates to a composition useful for eliminating water from wet surfaces.

BACKGROUND OF THE INVENTION

It is known that water can be eliminated from certain wet surfaces by bringing the wet surfaces into contact with dense organic liquids immiscible with water. These liquids generally contain a surface-active agent to displace the water, which floats on the surface of the liquid. The organic liquid is brought in contact with the surfaces to be treated, for example, by spraying, by application with a brush, by sprinkling or by immersion of the surfaces in the liquid. In the latter case, which is used in the majority of industrial installations, it is advantageous to stir the liquid bath by boiling, by mechanical means or by ultrasonic means.

The fluorinated demoisturizing solvent customarily used for the displacement of water from the surface of articles is trichloro-1,1,2-trifluoro-1,2,2-ethane containing one or more surfactants. It is generally preferred to use the surface-active agents at concentrations on the order of 0.01 to 1% by weight. The prior art teaches that the displacement of water by dense liquids containing surface-active agents is carried out by adsorption of the surface-active agent on the surfaces to be demoisturized in order to render them unwettable by water. The water is then collected in the form of droplets which rise to the surface and form a separable water layer.

French Pat. No. 1,541,592 describes a continuous demoisturizing process and arrangement which consists of bringing the articles in contact with the demoisturizing liquid by immersion of the articles in a turbulent zone of a bath, allowing the water displaced to float on the surface of the displacement liquid in a rest zone in the same bath and then separating the displaced water from the demoisturizing liquid. The demoisturizing solvent used in that process has been described in French Pat. No. 1,515,393 and consists of trichloro-1,1,2-trifluoroethane containing 0.5 to 3% by weight of a surface-active agent obtained by neutralizing a mixture of mono- and dialkyl phosphates with a saturated aliphatic amine, in particular, ethyl-2-hexylamine octylphosphates. That water displacement liquid does not, however, prove fully satisfactory and other types of surfactants have been recommended. Thus, French Pat. No. 2,040,733 describes the use of amine salts of N-oleyl-propylenediamine dioleate type as surface-active agents and French Pat. No. 2,205,562 describes the use of diamides of dioleyl-oleylamidopropylene amide type. French Pat. No. 2,217,045 describes the use of cationic surfactants derived from imidazoline. The compositions containing one of the latter three types of surface-active agents yield satisfactory results on drying, but present the disadvantage of forming an emulsion when they are mixed with water. Such emulsions are difficult to separate and the separation also takes place very slowly. That characteristic considerably reduces their practical usefulness, particularly in the case of a continuous drying process, in the course of which the demoisturizing composition is recycled.

A good demoisturizing composition must respond to at least the following three criteria:

(1) The composition must efficiently dry objects of various kinds. It must be suitable for metal objects, for surfaces of glass or refractory materials and for precious stones, as well as for plastics not attackable by those compositions. The elimination or displacement of water must be as rapid and as complete as possible.

(2) The demoisturizing composition must not form any emulsion on being brought in contact with water or, if such is not the case, the emulsion formed must be easily and rapidly separable into two phases. This criterion is very important, for in case of the formation of an emulsion which is difficult to separate into two phases, elimination of the aqueous layer in the course of the drying process would be very difficult and would entail the risk of carrying away a part of the demoisturizing composition emulsified in the water.

(3) In order to prevent the demoisturizing composition from being diminished in the course of the operation, it is very important that the surface-active agent not be extracted with the water or for that extraction to be very slight. It is thus highly desirable for the surfactant to have a greater affinity for the halogenated solvent than for water.

U.S. Pat. No. 4,182,687 describes a demoisturizing composition which responds to those three criteria. That composition consists of a fluorochlorocarbon, and mainly trichloro-1,1,2-trifluoro-1,2,2-ethane, containing a surface-active agent, whose cationic moiety has a formula:

in which:
m=2 or 3
n=1 or 2
m+n=4
R=an alkyl group of $C_6$ to $C_{18}$
R'=an alkyl group of $C_1$ to $C_2$ The anionic moiety of the formula of the surface-active agent can be varied, but the authors discovered that there is a correlation between the dimensions of the anionic moiety and the values of m and n i.e., the dimensions of the cationic moiety. Anions as different as halides, alkylphosphates, alkylcarboxylates, alkyl- or arylsulfonates, alkylsulfates or sulfosuccinates are usable, but the best results have been obtained with mono- and dialkyl phosphates. It has, furthermore, been shown that although the water displacement properties are generally good for any pair of cations and anions, a composition with good resistance to extraction of the surfactant with water, and not forming an emulsion in the course of use, can be obtained only with certain cation-anion pairs. Thus, in the case of the preferred anions in the above-mentioned patent, i.e., the mixtures of mono- and dialkyl phosphates:

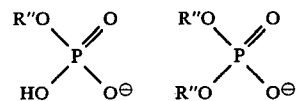

the radical R" is an alkyl group of $C_1$ to $C_{18}$, when m=3, and an alkyl group of $C_8$ to $C_{18}$, when m=2. The preferred products of the above-mentioned patent are the compositions containing a surface-active agent responding to the formulas:

and

and several examples of that patent show that the hexylphosphates (Ex. 27) or the butylphosphates (Ex. 26, 28, 32) of the same quaternary ammonium or of the same type of quaternary ammonium (m=2) are not usable, for these compositions form emulsions with water that are very difficult to separate into two phases. Since the surface-active agent specially used in the compositions described in that patent is not a readily available industrial product, the patentee showed that it can be formed in situ from commercial products according to the following equation:

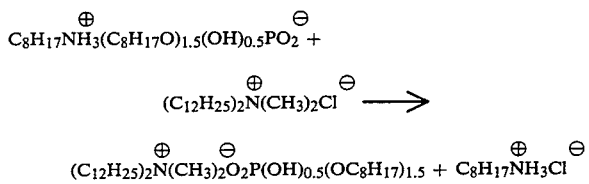

A composition containing stoichiometric quantities of quaternary ammonium hydrochloride, octylphosphate and octylamine thus yields the same results in the course of the drying process as a composition solely containing quaternary ammonium octylphosphate.

DISCLOSURE OF THE INVENTION

A more detailed study of the mode of preparation of those quaternary ammonium alkylphosphates according to the method described in the above-mentioned U.S. patent, i.e.:

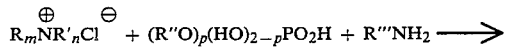

where p is a value ranging between 1 and 2, the applicants discovered that the final properties of demoisturizing compositions containing the surfactants so prepared depend on the nature of the R'''NH$_2$ amine. It was then discovered by the applicants that if the surfactant is made with the aid of an

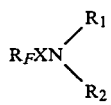

fluorinated amine, in which the R$_F$ group represents a perfluorinated aliphatic chain and X a divalent group, the drying properties of the final composition are very close to those obtained when the surfactant is prepared with the aid of a standard aliphatic amine, such as the octylamine used in the U.S. patent, but the properties of extractability with water and especially emulsification with water are significantly improved.

The present invention concerns a demoisturizing composition that does not produce stable emulsions with water, consisting essentially of a chlorofluorocarbon that is liquid at room temperature, preferably trichloro-1,1,2-trifluoro-1,2,2-ethane, and a surface-active agent whose cationic moiety corresponds to the formula:

R is an alkyl group of C$_6$ to C$_{18}$
R' is an alkyl group of C$_1$ to C$_2$
and the anionic part an alkylphosphate of the formula:

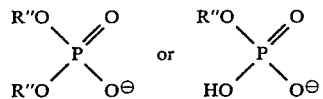

or a mixture of those two alkylphosphates, i.e., an alkylphosphate of the formula:

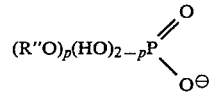

where p is a value ranging between 1 and 2 and where R'' is an alkyl group of C$_1$ to C$_{18}$.

The surface-active composition according to this invention is characterized in that it is obtained by reaction of quaternary ammonium hydrochloride

with alkylphosphoric acid

in the presence of a fluorinated amine corresponding to the formula:

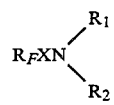

where R$_F$ represents a straight or branched C$_q$F$_{2q+1}$ perfluorinated chain in which q is a whole number ranging between 2 and 20, X is a divalent bond group, which can be partially halogenated, and R$_1$ and R$_2$ represent hydrogen, an alkyl radical or, an hydroxyalkyl radical containing less than 6 carbon atoms. The amines usable can be primary, secondary or tertiary amines, some nonlimiting examples include:

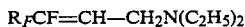

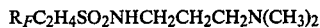

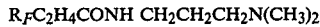

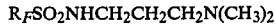

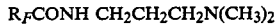

As can be observed from the above formulas, the type of divalent moiety (X) is not at all critical. It remains unchanged through the reaction and thus the only criteria is that it doesn't adversely affect the reaction. The same holds true for the $R_1$ and $R_2$ so long as these radicals do not interfere with the removal of the anion ($Cl^\ominus$) from the quaternary ammonium compound.

Those amines can be made according to methods known and described, for example, in French Pat. Nos. 1,532,284; 1,588,865; 2,102,753; 2,088,594 or 2,086,904 or in U.S. Pat. Nos. 2,764,202 or 2,759,019. The preferred amines of the invention are the products responding to the formula:

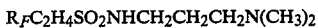

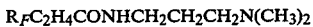

The alkylphosphate acids according to the invention are preferably the commercial products consisting of a mixture of monoalkylphosphoric acid and dialkylphosphoric acid:

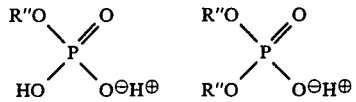

where R'' represents an alkyl radical of $C_1$ to $C_{18}$. The proportion by weight of the two acids generally ranges between 60/40 and 40/60. The preferred products of the invention are mixed salts, where R'' represents a butyl, hexyl, ethylhexyl, octyl or tridecyl group.

The quaternary ammonium chlorides usable in the process of the invention include:

where
R = an alkyl group of $C_6$ to $C_{18}$
R' = an alkyl group of $C_1$ to $C_2$.

Amines where R' is a methyl group and R is a $C_{12}H_{25}$ or a $C_{18}H_{37}$ group are particularly preferred. These amines are also available on the market. $R_2$ in the above formula is used to designate two R groups.

The commercial products are, in fact, generally obtained from fatty acids and are in that case mixtures of different homologues, the composition of which depends on the raw material used. Thus, the firm of Pierrefitte-Auby markets under the names of NORAMIUM M 2C and NORAMIUM M2 SH products corresponding to the formula:

where the compositions by weight of the fatty chain are as follows:

|  | NORAMIUM M2C | NORAMIUM M2SH |
|---|---|---|
| $C_8$ | 3% |  |
| $C_{10}$ | 6% |  |
| $C_{12}$ | 56% | 0.1% |
| $C_{14}$ | 18% | 0.9% |
| $C_{16}$ | 10% | 28% |
| $C_{18}$ saturated | 2% | 71% |
| $C_{18}$ unsaturated | 5% | — |

These products are perfectly suitable for practicing the invention.

In the course of preparation of the surface-active composition by mixture of the three constituents in the chlorofluorocarbon, namely, quaternary ammonium chloride, alkylphosphoric acid and fluorinated amine, the fluorinated amine hydrochloride is formed, which, as a function of its solubility in the medium, can either remain soluble or partially precipitate. In the case where the fluorinted amines yield an insoluble hydrochloride, the mixture can be used as is for demoisturizing and, in that case, the amine hydrochloride is progressively eliminated by dissolution in the water in the course of the drying process. It is nevertheless advantageous to eliminate the hydrochloride formed, for example, by filtration, so as to be able to have a perfectly homogeneous demoisturizing composition available. That filtration of the amine hydrochloride, or of the part of the amine hydrochloride which has precipitated in the medium, can be done on the final demoisturizing composition containing the required quantity of surface-active agent and that composition can then be used directly in the drying process after filtration. The elimination of the insoluble amine hydrochloride can also preferably be carried out on a concentrated solution of the same surface-active composition, the final demoisturizing solution being obtained from that concentrated and filtered solution by dilution with the chlorofluorocarbon. It is thus possible to prepare trichlorotrifluorocarbon compositions containing, for example, 10 to 30% of the surface-active composition, i.e., of the mixture of quaternary ammonium hydrochloride, alkylphosphoric acid or acids and fluorinated amine. After a few hours of standing, the solution can be filtered and the amine hydrochloride obtained. The quantity of amine hydrochloride depends essentially on the nature of the fluorinated amine. Thus, in the case of the amine of formula:

one recovers by filtration approximately 50% of the theoretical quantity of amine hydrochloride, and in the case of the amine:

the hydrochloride remains entirely in solution. After separation of the amine hydrochloride by filtration, the solution can be diluted with trichlorotrifluoroethane, so that the amount of surface-active agent concentration corresponds to that required for the demoisturizing operations. Dilution of the concentrated solution makes it possible to obtain a perfectly homogeneous liquid composition, usable for the drying operation.

The quantity of surface-active agent dissolved in the chlorofluorocarbon to give good drying properties can be very small. It generally ranges between 0.05 and 5 g of surface-active agent per liter of chlorofluorocarbon and, preferably, between 0.1 and 2.5 g per liter.

The effectiveness of the demoisturizing compositions according to this invention can be determined by a number of characteristic tests of the behavior of those compositions in industrial drying machines. Those tests are as follows:

fritted glass drying test
emulsification test
water extractability test.

The operation procedures used for those different tests are as follows:

(1) Fritted Glass Drying Test

A fritted glass dish weighing 3.2 g is thoroughly cleaned with a chromic-sulfuric acid mixture and then rinsed in water and dried. The dish is next soaked for ¼ hour in distilled water and then dipped for four minutes in 50 ml of the demoisturizing composition, kept in reflux. The dish is then soaked in 50 ml of anhydrous methanol for ½ hour. The determinations of water content of the methanol (Karl Fischer method) before and after soaking of the dish is used to calculate the quantity of water not eliminated by drying. When such a drying test is performed with trichlorotrifluoroethane not containing surface-active agent, the quantity of water not eliminated by the treatment is close to 400–450 mg. The compositions according to the invention, the results of which are indicated in the examples below, leave only approximately 30 to 50 mg of water on the fritted glass.

(2) Emulsification Test

Fifty ml of the demoisturizing composition are vigorously stirred with 20 ml of water for 30 seconds in a graduated cylinder. The emulsion is then left standing so that it is separated into two phases and the volumes of both phases, which are perfectly clear, are recorded as a function of time. This test thus makes it possible to determine the rate of separation of the emulsion into two phases and also makes it possible to verify which is the phase (aqueous or organic) that separates best.

(3) Extractability Test

Two hundred ml of demoisturizing composition containing 0.5% by weight surface-active agent are treated twice with 20 ml of distilled water, letting enough time elapse to obtain perfect decantation. By evaporation of the remaining composition and weighing of the residue after drying at 70° C. for 24 hours, the surface-active agent content of the water extracted composition is determined. By comparison with a control test, i.e., by determination of the dry extract of an identical composition not having been rinsed with water, the percentage of surface-active products extracted by the water can be determined.

The effectiveness of demoisturizing with the compositions according to the invention, i.e., the ability to displace water from the surfaces of objects, is excellent. Very low surface-agent contents, even less than 0.1 g/l, are very effective. Quaternary ammonium alkylphosphate base compositions are, in particular, much more successful than the amine alkylphosphate base compositions widely used in most industrial demoisturizing installations. The latter type of surface-active agent has, in fact, only slight drying efficiency, but offers the advantage of forming only emulsions that can be very easily separated into two phases, which has enabled them to take the lead on the market. The demoisturizing compositions of the invention, prepared according to the process of the invention, make it possible to combine good demoisturizing efficiency, low extractability with water and a slight tendency to emulsification.

The compositions according to the invention are generally used at concentrations ranging between about 0.05 and 5 g of surface-active material per liter of solvent, preferably between 0.1 and 1 g/l. The surface-active material is prepared by mixing quaternary ammonium chloride, alkylphosphoric acid and fluorinated amine, preferably, in stoichiometric quantities, but an excess or shortage of one of the three reagents do not fundamentally harm the demoisturizing process.

The surfaces from which water can be eliminated by means of the compositions according to the invention are not limited to any particular material. The compositions of this invention produce excellent results for the drying of glass. They are also usable for drying any insoluble solid substance not attackable by the compositions. Such materials can be metal surfaces such as ferrous metals, stainless steels, nickel and its alloys, chromium and its alloys, copper, brasses, bronzes, cadmium, silver, gold, platinum, titanium-base metals, etc. Other materials which can be treated for the elimination of water include, for example, refractory materials, such as alumina, silica, magnesia, or plastics like, for example, polyamides, polyethylene, polypropylene, polycarbonates and similar materials.

The following examples are intended to illustrate the invention, without, however, limiting it. A detailed description of the alkylphosphoric acids and quaternary ammonium chloride used in the examples is as follows:

(1) Ammonium dimethyldilauryl chloride

marketed by the firm of Pierrefitte-Auby under the name of NORAMIUM M2C. The commercial product is 75% active material in isopropanol, contains 0.161 chloride equivalent for 100 g and consists of a mixture of different homologues, in which the distribution of the fatty chains is as follows:

| | |
|---|---|
| $C_8$ | 3% |
| $C_{10}$ | 6% |
| $C_{12}$ | 56% |
| $C_{14}$ | 18% |
| $C_{16}$ | 10% |
| $C_{18}$ saturated | 2% |
| $C_{18}$ unsaturated | 5% |

(2) Ammonium dimethyldistearyl chloride

marketed by Pierrefitte-Auby under the name of NORAMIUM M2SH. The commercial product contains 75% active material, 0.135 chloride equivalent for 100 g, and has a distribution of fatty chains corresponding to:

| | |
|---|---|
| $C_{12}$ | 0.1% |
| $C_{14}$ | 0.9% |
| $C_{16}$ | 28% |
| $C_{18}$ | 71% |

(3) Butylphosphoric acid $(C_4H_9O)_{1.5}(OH)_{0.5}PO_2H$: The product used has the following acid values:

| | |
|---|---|
| strong acidity | 0.566 equivalent for 100 g |
| weak acidity | 0.276 equivalent for 100 g | which corresponds to a mixture containing approximately 40% monobutylphosphoric acid and 60% dibutylphosphoric acid.

(4) Octylphosphoric acid $(C_8H_{17}O)_{1.5}(HO)_{0.5}PO_2H$. The product has the following acid values:

| | |
|---|---|
| strong acidity | 0.378 equivalent for 100 g |
| weak acidity | 0.222 equivalent for 100 g | which corresponds to a mixture of 47% monooctyl acid and 42% dioctylphosphoric acid.

All of the Examples below were performed, using trichloro-1,1,2-trifluoro-1,2,2-ethane marketed by PCUK under the trademark FORANE 113 (F113) as the liquid chlorofluorocarbon. U.S. Pat. No. 4,182,687 is incorporated herein by reference for the disclosure of useful chlorofluorocarbons.

Examples 1, 2, 5 and 15 are not representative of the invention and concern rather the compositions already described in the prior art. These examples make it possible to show the superiority of the products produced according to the invention.

EXAMPLE 1
(Comparative)

This example corresponds to the composition disclosed in French Pat. No. 1,515,393. A solution of F113 containing 1 g/l of ethyl-2-hexylamine octylphosphate was prepared by mixing 1 part ethyl-2-hexylamine with 2.05 parts of the octylphosphoric acid in F113, so as to have a concentration of 1 g/l. That composition yielded the following results in the course of the three tests:

drying test at 1 g/l for 4 minutes: 328 mg of water not eliminated;
emulsification test: total separation into 50 ml of clear lower phase and 20 ml of clear higher phase in less than 1 min.;
extractability test: 11% of product extracted with water.

EXAMPLE 2
(Comparative)

This example corresponds to a composition described in U.S. Pat. No. 4,182,687. A solution was prepared, containing a surface-active agent corresponding to the formula:

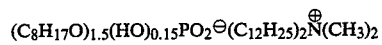

by dissolving in 900 g of F113:
61 g of NORAMIUM M2C
26 g of octylphosphoric acid
12.7 g of ethyl-2-hexylamine.

That solution with 8.5% dry extract does not give rise to any precipitation and was diluted to 0.5% and 0.85 g/l so as to be able to perform the demoisturizing tests.
drying test at 0.85 g/l for 4 minutes:
30 mg water not eliminated;
emulsification test at 0.85 g/l.

| Duration | Volumes of Clear Phases (ml) | |
|---|---|---|
| | Lower Phase | Upper Phase |
| 8 min. | 44 | 8 |
| 30 min. | 48 | 15 |
| 60 min | 49 | 18 | extractability test:
17.5% of product extracted with water.

EXAMPLE 3

A composition was prepared, containing a surfactant corresponding to the formula:

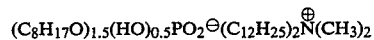

that is, identical to the one of Example 2, but prepared by replacing the ethyl-2-hexylamine with a fluorinated amine of formula:

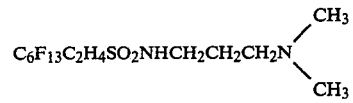

In order to do so, stoichiometric quantities of the three reagents were mixed in 150 g of F113, that is:
9.48 g of NORAMIUM M2C
4.04 g of octylphosphoric acid
7.83 g of

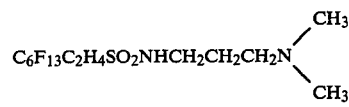

The initial solution clouds quite rapidly and after filtration, following 24 hours of standing, 4.8 g of a white crystallized solid was obtained, which was identified as being the fluorinated amine hydrochloride. The quantity of hydrochloride eliminated by filtration corresponds to 57% per mole of fluorinated amine used.

The filtrate, perfectly clear, can be diluted without giving rise to a new hydrochloride precipitation.

The tests yielded the following results:
drying test at 0.85 g/l (4 min.):
27 mg of water not eliminated;
extractability test: 2% of product extracted with water;
emulsification test at 0.85 g/l.

| Duration | Volume of Clear Phases (ml) | |
|---|---|---|
| | Lower Phase | Higher Phase |
| 3 min. | 45 | 10 |
| 8 min | 49 | 19 |
| 15 min. | 50 | 20 |

EXAMPLE 4

A composition similar to that of Example 3 was made as in Example 3 using:
8.3 g NORAMIUM M2C
4.03 g octylphosphoric acid
7.83 g of
$C_6F_{13}C_2H_4SO_2NHCH_2CH_2CH_2N(CH_3)_2$.
That composition contains 0.88 mole of NORAMIUM M2C per mole of octylphosphoric acid and per mole of amine; 4.8 g of fluorinated amine hydrochloride were recovered by filtration.

That composition yielded the following results:
drying test at 0.85 g/l:
27 mg of water not eliminated;
emulsification test at 0.85 g/l.

| Duration | Volume of Clear Phases | |
|---|---|---|
| | Lower Phase | Higher Phase |
| 3 min. | 40 | 17 |
| 8 min. | 49 | 19 |
| 15 min. | 50 | 20 |

The comparison tests 2, 3 and 4 makes it possible to verify that replacement of ethyl-2-hexylamine by the amine of formula:

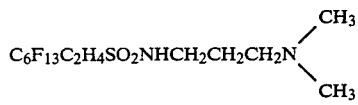

does not alter the effectiveness of drying, but diminishes the extractability of the surfactant with water and, above all, notably and substantially improves separation of the emulsion formed into two phases.

EXAMPLE 5

(Comparative)

This example uses a composition containing a surfactant responding to the formula:

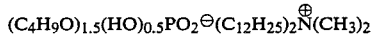

prepared according to the directions of U.S. Pat. No. 4,182,687. Such composition is, however, outside the scope of the invention of the U.S. patent because of its great facility in forming emulsions.

In order to prepare that composition, the following quantities of the three products were mixed in 600 g of F113:
9.48 g of NORAMIUM M2C
2.69 g of butylphosphoric acid
1.95 g of ethyl-2-hexylamine.

After dilution to 0.5% and 850 mg/l, the composition was tested with the following results:
drying test at 0.85 g/l (4 min.):
34 mg water not eliminated;
extractability test:
27% of product extracted with water;
emulsification test at 0.85 g/l.

| Duration | Volumes of Clear Phases | |
|---|---|---|
| | Lower Phase | Higher Phase |
| 8 min. | 35 | 2 |
| 30 min. | 43 | 2 |
| 60 min. | 45 | 2 |

EXAMPLE 6

A demoisturizing composition containing the same surfactant as that of Example 5 was prepared namely

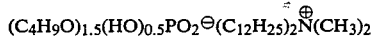

but using the $C_6F_{13}C_2H_4SO_2NHC_3H_6N(CH_3)_2$ fluorinated amine instead of ethyl-2-hexylamine.

The following were thus mixed:
50 g NORAMIUM M2C
14.2 g butylphosphoric acid
41.3 g of
$C_6F_{13}C_2H_4SO_2NHCH_2CH_2CH_2N(CH_3)_2$
600 g Forane 113.

The quantities used correspond to the stoichiometric quantities. After 10 hours of standing at room temperature, the mixture was filtered and 22.3 g of amine hydrochloride were obtained and identified as:

$C_6F_{13}C_2H_4SO_2NHCH_2CH_2CH_2N(CH_3L)_2HCl$.

The filtrate was then diluted to 707 g with Forane 113 so as to give a solution concentrated to 10% active material. The dilute solutions necessary for the demoisturizing process were prepared from that concentrated solution and were perfectly clear. The results of the tests are as follows:
drying test
0.85 g/l (4 min.) 33 mg of water not eliminated;
0.085 g/l (4 min.) 33 mg of water not eliminated;
0.85 g/l (10 min.) 30 mg of water not eliminated.
extractability test: 3.25% of product extracted with water;
emulsification test at 0.85 g/l.

| Duration | Volumes of Clear Phases | |
|---|---|---|
| | Lower Phase | Higher Phase |
| 3 min | 46 | 19 |
| 5 min. | 46 | 19.5 |
| 8 min. | 47 | 20 |
| 15 min. | 48 | 20 |

EXAMPLES 7 TO 10

Demoisturizing compositions containing the same surface-active agent as that of Example 6 were prepared, according to the same method and with the same

fluorinated amine, the respective quantities of the different reagents being varied.

| | Ex. 7 | | Ex. 8 | | Ex. 9 | | Ex. 10 | |
|---|---|---|---|---|---|---|---|---|
| | g | mole | g | mole | g | mole | g | mol |
| Noramium M2C | 8.32 | 0.88 | 10.6 | 1.12 | 9.46 | 1 | 9.46 | 1 |

-continued

|  | Ex. 7 | | Ex. 8 | | Ex. 9 | | Ex. 10 | |
|---|---|---|---|---|---|---|---|---|
|  | g | mole | g | mole | g | mole | g | mol |
| Butylphosphoric Acid | 2.69 | 1 | 2.69 | 1 | 2.69 | 1 | 2.69 | 1 |
| $C_6F_{13}C_2H_4SO_2NHC_3H_6N(CH_3)_2$ | 7.82 | 1 | 7.82 | 1 | 5.86 | 0.75 | 3.9 | 0.5 |
| Forane 113 | 150 | — | 150 | — | 150 | — | 150 | — |
| Weight of filtered hydrochloride | 4.2 | — | 4.5 | — | 4.2 | — | 3.5 | — |

The different tests yielded the following results:
drying test at 0.85 g/l for 4 minutes:
quantity of water not eliminated in mg:
Ex. 7, 33; Ex. 8, 23; Ex. 9, 45 and Ex. 10, 20.
emulsification test at 0.85 g/l:

| Duration in Minutes | Volumes of Clear Phases | | | | | | | |
|---|---|---|---|---|---|---|---|---|
|  | Lower Phase | | | | Higher Phase | | | |
|  | Ex. 7 | Ex. 8 | Ex. 9 | Ex. 10 | Ex. 7 | Ex. 8 | Ex. 9 | Ex. 10 |
| 3 | 45 | 47 | 45 | — | 19 | 18 | 17 | — |
| 5 | 46 | 48 | — | 15 | 19.5 | 19 | — | 7 |
| 8 | 47 | 48 | 47 | 23 | 20 | 20 | 19 | 10 |
| 15 | 48 | 49 | 47 | — | 20 | 20 | 19.5 | — |
| 30 | — | — | — | 32 | — | — | — | 15 |

The comparison of tests 5 and 6 to 10 factually verifies that a composition containing the surface-active agent:

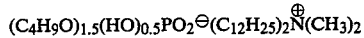

is not effectively usable for demoisturizing when it is prepared by reaction of the hydrochloride, butylphosphoric acid and octylamine, as indicated in U.S. Pat. No. 4,182,687, because it readily forms an emulsion with water that is very difficult to separate into two phases. On the other hand, when that same surface-active agent is obtained by reaction in the presence of

the composition yields emulsions which are very easily and very rapidly separated into two clear phases.

EXAMPLES 11 TO 14

Compositions containing the same surface-active agent as that of Examples 5 to 10 were obtained by reacting NORAMIUM M2C with butylphosphoric acid in the presence of different fluorinated amines. Those three reagents were always used in stoichiometric quantities.

In the course of the four tests, the following were mixed in 150 g of F113:
9.46 g NORAMIUM M2C
2.69 g butylphosphoric acid
plus the following quantities of the different fluorinated amines:
Ex. 11: 8.3 g of a fluorinated amine mixture consisting of:

60% $C_8F_{17}C_2H_4N(C_2H_4OH)_2$

40% $C_7F_{15}CF{=}CH{-}CH_2N(C_2H_4OH)_2$

Ex. 12: 8.9 g of an amine mixture of formula

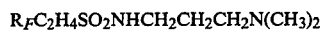

containing:

| 1% of product with $R_F =$ | $C_4F_9$ |
|---|---|
| 48% | $C_6F_{13}$ |
| 30% | $C_8F_{17}$ |
| 12% | $C_{10}F_{21}$ |
| 5.5% | $C_{12}F_{25}$ |
| 2% | $C_{14}F_{29}$ |
| 1% | $C_{16}F_{33}$ |
| 0.5% | $C_{18}F_{37}$ |

Ex. 13: 7.8 g of a fluorinated amine mixture consisting of:

20% $C_8F_{17}C_2H_4N(C_2H_5)_2$

80% $C_7F_{15}CF{=}CH{-}CH_2{-}N(C_2H_5)_2$

Ex. 14: 8.8 g of fluorinated amine of formula:

$C_8F_{17}C_2H_4CONHCH_2CH_2CH_2N(CH_3)_2$

The composition of Example 11 remained clear, while the other three gave rise to a precipitation of amine hydrochloride which was eliminated by filtration. The concentrated solutions were then diluted to 0.85 g/l of active material and were tested.
drying test at 0.85 g/l for 4 minutes:
quantity of water not eliminated in mg:
Ex. 11, 37; Ex. 12, 44; Ex. 13, 31, Ex. 14, 28.
extratability test:
product extracted with water: Ex. 12, 2% and Ex. 14, 1%.
emulsification test at 0.85 g/l

| Duration in Mins. | Volumes of Clear Phases | | | | | | | |
|---|---|---|---|---|---|---|---|---|
|  | Lower Phase | | | | Higher Phase | | | |
|  | Ex. 11 | Ex. 12 | Ex. 13 | Ex. 14 | Ex. 11 | Ex. 12 | Ex. 13 | Ex. 14 |
| 3 | 42 | 44 | 30 | 47 | 12 | 15 | 3 | 19 |
| 8 | 45 | 46 | 45 | 48 | 16 | 18 | 6 | 20 |
| 30 | 46 | 48 | 47 | 49 | 17 | 19 | 15 | 20 |

EXAMPLE 15

(comparative)

A composition containing a surface-active agent of formula:

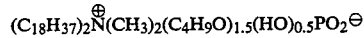

was prepared according to the directions of U.S. Pat. No. 4,182,687 by mixing in 150 g of Forane 113:
NORAMIUM M2SH 11.3 g Butylphosphoric acid 2.7 g
Ethyl-2-hexylamine 1.97 g That slightly cloudy solution was diluted to 0.5% and 0.85 g/l in order to be able to perform the tests:

drying test at 0.85 g/l for 4 minutes:
29 g of water not eliminated.
extractability test: 30% of product extracted with water.
emulsification test at 0.85 g/l

| Duration | Volume of Clear Phases | |
|---|---|---|
| | Lower Phase | Higher Phase |
| 3 min. | 45 | 1 |
| 8 min. | 48 | 1 |
| 15 min. | 49 | 1 |

EXAMPLE 16

A composition containing the same surfactant as that of Example 15 that is:

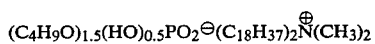
$(C_4H_9O)_{1.5}(HO)_{0.5}PO_2^{\ominus}(C_{18}H_{37})_2\overset{\oplus}{N}(CH_3)_2$ was prepared by replacing the ethyl-2-hexylamine with the fluorinated amine of formula:

$C_6F_{13}C_2H_4SO_2NHC_3H_6N(CH_3)_2$

The following were thus mixed in 150 g of Forane 113:
11.3 g NORAMIUM M2SH
2.7 g Butylphosphoric acid
7.83 g of $C_6F_{13}C_2H_4SO_2NHCH_2CH_2CH_2N(CH_3)_2$ The solution obtained was filtered after 48 hours of standing and was tested after dilution with Forane 113.

drying test at 0.85 g/l (4 minutes):
38 mg of water not eliminated.
extractability test:
11% of product extracted with water.
emulsification test at 0.85 g/l

| Duration | Volume of Clear Phases | |
|---|---|---|
| | Lower Phase | Higher Phase |
| 3 mins. | 50 | 20 |

In short, the above representative and comparative examples well illustrate the invention and show when the surface-active composition corresponding to the formula:

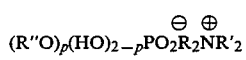
$(R''O)_p(HO)_{2-p}PO_2^{\ominus}R_2\overset{\oplus}{N}R'_2$ where R, R', R" and p have the meanings indicated above, is prepared by reaction of quaternary ammonium hydrochloride

$R_2\overset{\oplus}{N}R'_2Cl^{\ominus}$ with alkylphosphoric acid, $(R''O)_p(HO)_{2-p}PO_2H$, in the presence of a fluorinated amine:

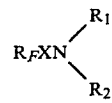
$R_fXN\begin{matrix}R_1\\R_2\end{matrix}$ the properties required to assure good demoisturizing compositions are markedly better than when the same composition is prepared with a nonfluorinated aliphatic amine such as ethyl-2-hexylamine.

The use of a fluorinated amine makes it possible to obtain surface-active compositions that are more difficult to extract with water. The main advantage, which is industrially very important, is, however, a markedly reduced tendency for the compositions to emulsify in the presence of water.

The differences in properties of compositions prepared according to the two methods are particularly pronounced in the case of surface-active agents whose anion is a butylphosphate. This is illustrated by comparative Examples 5 and 6 concerning:

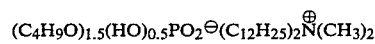
$(C_4H_9O)_{1.5}(HO)_{0.5}PO_2^{\ominus}(C_{12}H_{25})_2\overset{\oplus}{N}(CH_3)_2$ and Examples 15 and 16 concerning:

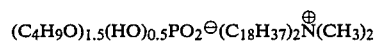
$(C_4H_9O)_{1.5}(HO)_{0.5}PO_2^{\ominus}(C_{18}H_{37})_2\overset{\oplus}{N}(CH_3)_2$ The two compositions containing these surfactants prepared with the aid of ethyl-2-hexylamide (Ex. 5 and 15) quite readily formed emulsions, which take very long to separate into two phases. In the case of preparation in the presence of the fluorinated amine (Ex. 6 and 16, for instance), the emulsions formed are very rapidly and easily separated into two phases.

The same phenomenon is perceptible in the case of octylphosphate-base compositions (Ex. 2 and 3).

We claim:

1. A demoisturizing composition for the displacement of liquid water comprising a chlorofluorocarbon having at least two carbon atoms that is liquid at room temperature, a sufficient amount of a surfaceactive agent dissolved therein so as to impart water displacement characteristics to the composition, said surface-active agent corresponding to the formula:

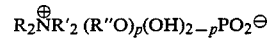
$R_2\overset{\oplus}{N}R'_2 (R''O)_p(OH)_{2-p}PO_2^{\ominus}$ in which
R is an alkyl group containing 6 to 18 carbon atoms;
R' is an alkyl group containing 1 to 2 carbon atoms;
R" is an alkyl group containing 1 to 18 carbon atoms; and
p is a value ranging between 1 and 2 and wherein said surface-active agent is prepared by mixing the following compounds:

$R_2\overset{\oplus}{N}R'_2Cl^{\ominus}$     (1)

$(R''O)_p(HO)_{2-p}PO_2H$, and     (2)

$R_fXN\begin{matrix}R_1\\R_2\end{matrix}$     (3)

where $R_f$ represents a straight or branched perfluorinated alkyl chain of formula $C_qF_{2q+1}$ in which q is a whole number ranging between 2 and 20 and where X is a divalent bond group, which can be partially halogenated, and $R_1$ and $R_2$ represent a hydrogen atom, an alkyl radical or a hydroxyalkyl radical, containing less than six carbon atoms, and wherein

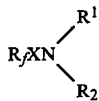

is at least partially present as a soluble hydrochloride.

2. The composition according to claim 1 in which the chlorofluorocarbon is trichloro-1,1,2-trifluoro-1,2,2-ethane.

3. The composition according to claim 1 in which the cationic part of the surface-active agent is the didodecyldimethyl ammonium cation or mixtures of homologues principally containing that cation.

4. The composition according to claim 1 in which the cationic part of the surface-active agent is the dioctadecyldimethyl ammonium cation or mixtures of homologues principally containing that cation.

5. The composition according to claim 1 in which the alkylphosphoric acid is a mixture of monobutyl and dibutylphoric acids.

6. The composition according to claim 1 in which the alkylphosphoric acid is a mixture of monooctyl and dioctylphoric acids.

7. The composition according to claim 1 in which the fluorinated amine responds to the formula:

where $R_F$ has the meaning described in claim 1.

8. The composition according to claim 1 in which the fluorinated amine responds to the formula:

9. The composition according to claim 1 in which the amount of surface active agent ranges from about 10 to 30% of the composition.

10. The composition according to claim 1 in which the amount of surface active agent ranges from about 0.05 to 5.0 gram/liter of chlorofluorocarbon.

11. The composition according to claim 1 wherein the amount of surface active agent ranges from about 0.1 to 1.0 gram/liter of chlorofluorocarbon.

12. The composition according to claim 1 in which the alkyl phosphate acids are a mixture of monoalkyl phosphoric acid and dialkyl phosphoric acid.

13. The composition according to claim 12 in which the proportion by weight of the monoalkyl phosphoric acid to dialkyl phosphoric acid is between about 60:40 and 40:60.

14. The process of removing water from a surface which comprises contacting the surface with a demoisturizing composition according to claim 1.

15. A demoisturizing composition for the displacement of liquid water comprising trichloro-1,1,2-trifluoro-1,2,2-ethane and a sufficient amount of a surface-active agent corresponding to the formula:

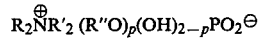

where said surface-active agent is prepared by mixing the following compounds:

 (1)

 (2)

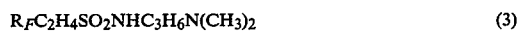 (3)

wherein:

is a didodecyl dimethyl ammonium cation, a dioctadecyl dimethyl ammonium cation, or mixtures of homologues principally containing either of those cations;

$(R''O)_p(HO)_{2-p}PO_2H$ is a mixture of monobutyl and dibutyl phosphoric acids or a mixture of monooctyl and dioctyl phosphoric acids; and $R_F$ is a straight or branched perfluorinated alkyl chain of formula $C_qF_{2q+1}$ in which q is a whole number ranging between 2 and 20, and wherein $R_FC_2H_4SO_2NHC_3H_6N(CH_3)_2$ is at least partially present as a soluble hydrochloride.

16. The composition according to claim 15 in which the proportion by weight of the monoalkyl phosphoric acid to dialkyl phosphoric acid is between about 60:40 and 40:60.

17. The composition according to claim 15 in which the amount of surface active agent ranges between about 0.05 and 5 gram/liter of trichloro-1,1,2-trifluoro-1,2,2-ethane.

18. The composition according to claim 15 in which the amount of surface active agent ranges between about 0.1 and 2.5 gram/liter of trichloro-1,1,2-trifluoro-1,2,2-ethane.

19. The composition of claim 15 wherein the amount of surface active agent ranges between about 10 and 30% of the composition.

20. The process of removing water from a surface with a demoisturizing composition according to claim 15.

21. A demoisturizing composition for the displacement of liquid water, comprising trichloro-1,1,2-trifluoro-1,2,2, ethane and a sufficient amount of a surface active agent corresponding to the formula:

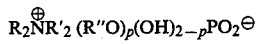

wherein said surface-active composition is prepared by mixing the following compounds:

 (1)

 (2)

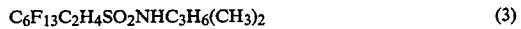 (3)

wherein

is a didodecyl dimethyl ammonium cation, a dioctadecyl dimethyl ammonium cation, or mixtures of homologues principally containing either of those cations; and $(R''O)_p(HO)_{2-p}PO_2H$ is a mixture of monooctyl or dioctyl phosphoric acids, with the proportion of mono to di acid ranging from about 40:60 to 60:40, and wherein $C_6F_{13}C_2H_4SO_2NHC_3H_6(CH_3)_2$ is at least partially present as a soluble hydrochloride.

22. The process of removing water from a surface with a demoisturizing composition according to claim 21.

23. A demoisturizing composition for the displacement of liquid water comprising a chlorofluorocarbon having at least two carbon atoms that is liquid at room temperature, and a sufficient amount of a surface-active agent corresponding to the formula:

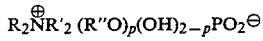

in which:
R is an alkyl group containing 6 to 18 carbon atoms;
R' is an alkyl group containing 1 to 2 carbon atoms; and
R'' is an alkyl group containing 1 to 18 carbon atoms; and
p is a value ranging between 1 and 2;
wherein said surface-active composition is prepared by mixing the following compounds:

 (1)

$(R''O)_p(HO)_{2-p}PO_2H$ and (2)

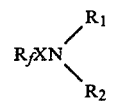 (3)

wherein

is a didodecyl dimethyl ammonium cation, a dioctadecyl dimethyl ammonium cation, or mixture of homologues principally containing either of those cations;

$(R'')_p(HO)_{2-p}PO_2H$ is a mixture of monooctyl and dioctyl phosphoric acids;

$R_f$ represents a straight or branched perfluorinated alkyl chain of formula $C_qf_{2q+1}$ in which q is a whole number ranging between 2 and 20 and where x is a divalent bond group which can be partially halogenated; and $R_1$ and $R_2$ represent a hydrogen atom, an alkyl radical, or a hydroxy alkyl radical containing less than 6 carbon atoms, and wherein

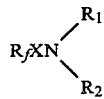

is at least partially present as a soluble hydrochloride.

24. The process of removing water for a surface with a demoisturizing composition according to claim 23.

* * * * *